3,031,961
METHOD OF TYPOGRAPHIC PRINTING

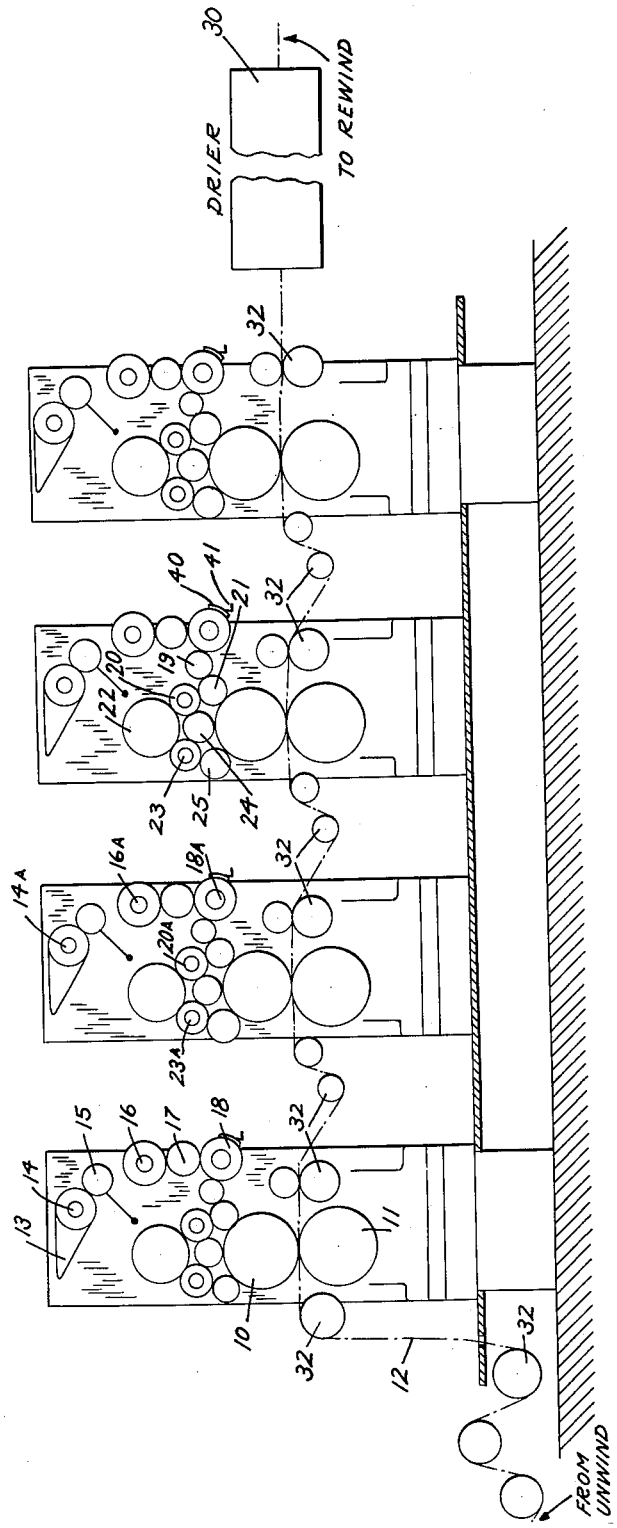

Robert S. Czeropski, Chester Nocek, and Bohdan Burachinsky, Chicago, Ill., assignors to Interchemical Corporation, New York, N.Y., a corporation of Ohio
Filed Jan. 2, 1959, Ser. No. 784,479
4 Claims. (Cl. 101—426)

This invention relates to the art of typographic printing with inks which dry by absorption of moisture, and aims to make possible high speed web printing with inks of this general type, while at the same time ensuring good printing quality.

Moisture setting inks were introduced into the trade in the late thirties, and have attained wide popularity in the printing of packages, particularly for food stuffs. These inks are dispersions of colorants in vehicles consisting of (a) a water miscible hygroscopic solvent, generally a glycol, and (b) a resin which is soluble in the solvent, but which is precipitated out when sufficient water is absorbed by the solvent. The inks dry by absorbing water from the stock, the air or from steam or water directed at the printed surface; the water absorbed by the ink separates the resin from the solvent-water combination, which is rapidly absorbed by the stock. Such inks set much more rapidly than conventional linseed oil links, and they can be formulated to be substantially non-odorous, hence their desirability for printing food packages.

Certain difficulties are encountered in printing moisture setting inks on conventional typographic presses, with their extended distribution systems. With differences in ordinary ambient conditions, an ink which distributes and prints one day will not do so another day when the relative humidity is substantially higher. It has been necessary, in order to produce satisfactory inks, to build in resistance to the higher humidities encountered. This in turn slows up the drying of the ink. Even inks formulated for the lowest normal humidity ranges (to be printable up to 65% relative humidity) will not dry sufficiently fast enough in multiple films to permit web printing in excess of about 300 to 400 feet per minute, unless back waxing or spraying of the web to prevent offset is resorted to. And for most printing plants, inks must be formulated to be printable up to 80% to 90% relative humidity, and these inks cannot be dried at speeds in excess of about 200 feet per minute.

Inks based on glycols also have certain advantages when designed to be dried by heat alone, and are used to some extent in the high speed printing of publications. But such inks have had to be formulated to be substantially insensitive to moisture in order to ensure proper printability, and hence are essentially heat drying inks, making no use of the moisture precipitation principle in their drying.

It would obviously be advantageous to maintain the press-room at relatively low constant humidity, so that inks would not be subjected to the vagaries of ambient humidity changes. But the cost of controlled dehumidification is so high as to outweigh the advantages. Furthermore, if the press-room is maintained at a relatively low relative humidity, the paper kept there tends to dry out, and this causes later difficulties in printing and processing.

It has been proposed to improve printability and increase the drying speed of moisture setting inks in press-rooms where the ambient humidity varies over wide limits, by maintaining about the distribution system of a typographic press with an extended distribution system, a body of air with a relative humidity below the relative humidity of the press-room in general, and in no event above 50%. This method produces satisfactory high speed printing, but involves the installation of devices for drying air and conducting it to the vicinity of the press, so that a substantial capital investment is still necessary to enable the use of inks which are not printable at relative humidities above 50%, and which dry much more rapidly than inks which are printable at 65% or higher relative humidity.

The surprising discovery has now been made that by merely heating the rollers of the distribution system of a typographic press with an extended distribution system, the resistance of any ink to precipitattion by the moisture in the ambient atmosphere is substantially increased, and that if the temperature is raised about 20° F. or more above the ambient temperature, fast drying moisture setting inks, which are not printable at relative humidities of 50% and higher, can be printed at very high ambient relative humidities without any control of the ambient atmosphere about the press or its distribution system, and these inks can be dried at press speeds of the order of 1,000 feet per minute in an ordinary steam drier.

The invention can best be understood by reference to the drawing, which shows schematically a four color press equipped for the practice of the invention.

The press comprises 4 separate units of substantially identical design, identified in the drawing by the color which is ordinarily printed by the unit. Each unit consists of a printing cylinder 10 having a printing plate mounted on it, and an impression cylinder 11. A web 12 of paper is fed from an unwind reel through the press by appropriate rollers 32, preferably passing after printing into a conventional steam drier 30 to set the ink by a combination of moisture and heat. A water spray may also be used to set the ink.

Each plate is inked by a distributing system which comprises a series of rollers operating between the fountain 13 and the plate. The heated metal fountain roller 14 takes ink from the fountain, a rubber ductor roller 15, picks the ink off of the roller 14, and the ink is transferred thence to a heated metal roller 16, to a rubber roller 17, and then to the oscillating heated metal ink storage roller 18. A rubber idler roller 19 takes the ink to the final stages of the distributing system, contacting the form roller 21 which inks the plate and contacts the heated metal roller 20; roller 20 is in contact with distributing roller 22 and form roller 24; the heated metal roller 23 inks both the form rollers 24 and 25.

Each of the metal rollers is indicated as having a hollow core (14A, 16A, 18A, 20A) so that a heating liquid can be circulated through it to maintain the rollers at the desired differential above ambient temperatures. The surfaces of the rubber rollers are heated by the ink and the metal rollers to approximately uniform temperature. The ink in the fountain is also preferably heated to insure uniformity of temperature.

Temperature measuring devices 40 are provided at one or more strategic points in each distributing system. These are connected by electrical leads 41 to registering devices where the temperatures can be read accurately. The registering devices are also preferably connected to controls which automatically keep the temperature of the rollers within a predetermined range. As shown in the drawings, these devices 40 may be mounted on the large oscillating metal roller 18, known in this particular distributing system as the ink storage roller.

In the practice of the invention, conventional water setting inks may be used to advantage. These inks comprise pigments dispersed in varnishes which are solutions of resins in glycols and/or polyglycols, using resins with high water tolerance, e.g., unesterified rosin maleic acid or fumaric acid adducts. Such inks are generally printable, without any addants, up to about 65% to 70% relative humidity at 75° F. In conventional practice, these inks are formulated with addants, such as triethanolamine, solid polyglycols, or other materials to give more water tolerance, so as to be printable up to 80% to 90% relative humidity at 75° F., depending on climatic conditions. The addants used affect the drying rate, cause some pigments to change color, and may adversely affect film properties. By using the invention, it is possible to use conventional maleated-rosin glycol inks without any addants, without regard to ambient conditions.

Thus, a group of bread wrapper inks of the following formulations were tested.

Yellow Ink A

| | Parts |
|---|---|
| Varnish A | 30.0 |
|   56% fumarated rosin | |
|   44% diethylene glycol | |
| Varnish B | 6.0 |
|   29% Zein | |
|   71% diethylene glycol | |
| Paraffin wax compound | 6.0 |
| Diethylene glycol | 3.0 |
| Light chrome yellow | 55.0 |

Red Ink B

| | Parts |
|---|---|
| Varnish A | 36.0 |
| Varnish B | 6.0 |
| Paraffin wax compound | 6.0 |
| Diethylene glycol | 12.0 |
| Brilliant red lake | 6.0 |
| Barium red lake C | 6.0 |
| Molybdated chrome orange | 28.0 |

Blue Ink C

| | Parts |
|---|---|
| Varnish A | 39.0 |
| Varnish B | 6.0 |
| Wax compound | 6.0 |
| Diethylene glycol | 15.5 |
| Clay | 25.0 |
| Victoria blue phosphomolybdate lake | 3.0 |
| Methyl violet phosphomolybdate lake | 3.0 |
| Alkali blue | 2.5 |

All parts are on a weight basis.

These inks, which became unprintable at 90° F. when the relative humidity reached 75%, were printed with the roller temperatures adjusted to 100° F. and 110° F. (10° F. and 20° F. above ambient temperature) with the following results:

| | Yellow Ink A | Red Ink B | Blue Ink C |
|---|---|---|---|
| No heating, Press rollers at 90° F. | Failed at 75% R.H. | Failed at 75% R.H. | Failed at 74% R.H. |
| Press rollers at 100° F. | Failed at 92% R.H. | Failed at 85% R.H. | Failed at 89% R.H. |
| Press rollers at 110° F. | O.K. at 100% R.H. | O.K. at 100% R.H. | O.K. at 100% R.H. |

More important, it is possible to utilize inks which are ordinarily unstable at ambient relative humidities of 50% to 55% and lower at 75° F. and thereby get faster drying and consequent higher press speeds of the order of 1,000 feet per minute using ordinary steam driers. A typical satisfactory group of inks can be made by using formulas identical with those shown above for conventional moisture setting inks (yellow ink A, red ink B, blue ink C), but substituting for the varnish therein the following:

(D)

| | Parts by weight |
|---|---|
| Arochem 462 (85.1% fumarated rosin—15.9% pentaerythritol) | 51.4 |
| Diethylene glycol | 48.6 |

(E)

| | |
|---|---|
| Arochem 462 | 35.0 |
| Fumarated rosin | 15.0 |
| Ethylene glycol | 25.0 |
| Diethylene glycol | 25.0 |

These inks fail at relatively low relative humidities (65% or less) at 90° F.; when the rollers are heated, however, the inks become printable at much higher relative humidities, in accordance with the following tables. The following results were obtained under the same conditions as the tests on the A, B and C group.

| D Series | Yellow | Red | Blue |
|---|---|---|---|
| No heat, Press rollers at 90° F. | Failed at 65% R.H. | Failed at 56% R.H. | Failed at 58% R.H. |
| Press rollers at 100° F. | Failed at 78% R.H. | Failed at 68% R.H. | Failed at 71% R.H. |
| Press rollers at 110° F. | O.K. at 100% R.H. | Failed at 82% R.H. | Failed at 89% R.H. |
| Press rollers at 120° F. | | O.K. at 100% R.H. | O.K. at 100% R.H. |

| E Series | Yellow | Red | Blue |
|---|---|---|---|
| No heat, Press rollers at 90° F. | Failed at 50% R.H. | Failed at 44% R.H. | Failed at 40% R.H. |
| Press rollers at 100° F. | Failed at 65% R.H. | Failed at 49% R.H. | Failed at 52% R.H. |
| Press rollers at 110° F. | Failed at 82% R.H. | Failed at 65% R.H. | Failed at 65% R.H. |
| Press rollers at 120° | O.K. at 100% R.H. | Failed at 81% R.H. | Failed at 82% R.H. |
| Press Rollers at 130° F. | | O.K. at 100% R.H. | O.K. at 100% R.H. |

It will be noted that in the A, B and C series, the inks which normally fail at 75% R.H. are stable well above this figure when the roller temperature is controlled 10° F. above the ambient temperature, and when the rollers are maintained at 20° F. above the ambient temperature, the inks are stable at even 100% relative humidity. In the D and E series, where the inks fail above about 55% relative humidity, the significant rise in stability occurs at about 20° F. above ambient temperatures, and resistance to 100% humidity may require a 40° temperature gradient.

Temperature gradients above 40° may be used, but if the rollers get much too hot, evaporation of the solvent becomes a problem. Hence, it is preferred not to heat the rollers above the point where the inks are stable at 100% relative humidity in the ambient air. If the room is cool to start with, the temperature gradient may be larger than if the room is warm, since the evaporation of the ink solvent is a function of the actual temperature rather than the gradient. In general, it is desirable not to heat the rollers above about 140° F. to 150° F.

The rollers should be maintained at the desired temperature gradient throughout the printing operation, since once the ink is precipitated on the plate cylinder, it is difficult to redissolve the precipitated ink, and the plate is preferably cleaned of all its ink and the printing restarted. Hence, it is desirable to heat the distribution system to the desired temperature before inking.

Obviously changes can be made in the specific examples shown without departing from the scope of the invention as defined in the claims.

What is claimed is:

1. In a method of printing on a typographic press with an extended distribution system comprising ink distributing rollers, with inks which comprise pigments dispersed in solutions of resin in solvents of the class consisting of glycols and polyglycols, and which can be set by the addition of moisture thereto and which are unprintable at the ambient relative humidity about the press at the time of printing, the improvement which comprises printing while maintaining the rollers of the distribution system of the press at a temperature at least 10° F. above the ambient temperature, but not in excess of 150° F., whereby the relative humidity immediately adjacent the inks on the press is decreased to and maintained at a point where the inks become printable.

2. The method of web printing at speeds substantially in excess of 400 feet per minute on a typographic press with an extended distribution system comprising ink distributing rollers, with inks which comprise pigments dispersed in solutions of resin in solvents of the class consisting of glycols and polyglycols, which can be set by the addition of moisture thereto, and which are unprintable on the press at ordinary ambient relative humidities above about 55%, which comprises printing said inks at ambient relative humidities above 55% on a web while maintaining the rollers of the distribution system of the press at a temperature at least 20° F. above the ambient temperature, but not in excess of 150° F., and drying the inks by subjecting the web to the action of moisture.

3. The method of web printing at speeds substantially in excess of 400 feet per minute on a typographic press with an extended distribution system comprising ink distributing rollers, with inks which comprise pigments dispersed in solutions of resin in solvents of the class consisting of glycols and polyglycols, which can be set by the addition of moisture thereto, which are unprintable on the press at ordinary ambient relative humidities above about 55%, which comprises printing said inks at ambient relative humidities above 55% on a web while maintaining the metal rollers of the distribution system of the press at a temperature at least 20° F. above the ambient temperature, but not in excess of 150° F., and drying the inks by subjecting the web to the action of steam.

4. The method of web printing at speeds substantially in excess of 400 feet per minute on a typographic press with an extended distribution system comprising ink distributing rollers, with inks which comprise pigment dispersed in solutions of resin in solvents of the class consisting of glycols and polyglycols, which can be set by the addition of moisture thereto, and which are unprintable on the press at ordinary ambient relative humidities above about 55%, which comprises printing said inks at ambient relative humidities above 55% on a web while maintaining the metal rollers of the distribution system of the press at a temperature of 20° F. to 40° F. above the ambient temperature, and drying the ink by subjecting the web to the action of steam.

References Cited in the file of this patent

UNITED STATES PATENTS

| | | |
|---|---|---|
| 1,459,391 | Clausen | June 19, 1923 |
| 1,883,257 | Wood | Oct. 18, 1932 |
| 2,025,045 | Goedike | Dec. 24, 1935 |
| 2,613,603 | Ireton | Oct. 14, 1952 |